United States Patent
Zhang et al.

(10) Patent No.: US 11,194,877 B2
(45) Date of Patent: Dec. 7, 2021

(54) PERSONALIZED MODEL THRESHOLD

(71) Applicant: Microsoft Technology Licensing, LLC, Redmond, WA (US)

(72) Inventors: Xiaowen Zhang, San Francisco, CA (US); Qing Duan, Santa Clara, CA (US); Xiaoqing Wang, San Jose, CA (US); Junrui Xu, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 242 days.

(21) Appl. No.: 16/669,198

(22) Filed: Oct. 30, 2019

(65) Prior Publication Data
US 2021/0133266 A1  May 6, 2021

(51) Int. Cl.
*G06F 16/9536* (2019.01)
*G06F 16/9535* (2019.01)
*G06N 20/00* (2019.01)

(52) U.S. Cl.
CPC ...... *G06F 16/9536* (2019.01); *G06F 16/9535* (2019.01); *G06N 20/00* (2019.01)

(58) Field of Classification Search
CPC .. G06F 16/9536; G06F 16/9535; G06N 20/00
See application file for complete search history.

(56) References Cited

U.S. PATENT DOCUMENTS

| 2015/0310392 | A1* | 10/2015 | Wu | G06Q 10/1053 705/321 |
| 2016/0307160 | A1* | 10/2016 | Khasnis | G06Q 10/1053 |
| 2017/0308863 | A1* | 10/2017 | Pitts | G06Q 10/1053 |

* cited by examiner

*Primary Examiner* — Etienne P Leroux
(74) *Attorney, Agent, or Firm* — Schwegman Lundberg & Woessner, P.A.

(57) ABSTRACT

In an example the output of a machine learned model is a score is then compared to a threshold, and if the score transgresses the threshold, the corresponding item is available to be recommended to the user via the graphical user interface. In an example embodiment, rather than a fixed (static) threshold, a dynamic threshold is utilized. This dynamic threshold is based on a harmonic mean of probabilities utilized in the GLMix model. Specifically, the GLMix model may calculate and utilize the probability that a user will engage with a particular item via a graphical user interface, and also a probability that a user will dismiss a particular item via a graphical user interface.

20 Claims, 8 Drawing Sheets

PERSONALIZED MODEL THRESHOLD

TECHNICAL FIELD

The present disclosure generally relates to technical problems encountered in providing predictions on computer networks. More specifically, the present disclosure relates to the use of a personalized model threshold for predictions.

BACKGROUND

The rise of the Internet has occasioned two disparate yet related phenomena: the increase in the presence of social networking services, with their corresponding member profiles visible to large numbers of people, and the increase in the use of these social networking services to perform searches or obtain information. An example of a common search or recommendation provided on a social networking service is the search for jobs that have been posted on, or linked to by, the social networks.

A technical problem encountered by social networking services in managing online job searches is that determining how to serve the most appropriate and relevant job results with minimal delay becomes significantly challenging as the number of sources and volumes of job opportunities via the social networking services grows at an unprecedented pace.

Personalization of job search and other results is also preferential. For example, when users search for a query like "software engineer", depending on the skills, background, experience, location, and other factors about the users, the odds that the users will interact with the results (such as by applying to an underlying job) can be drastically different. For example, a person skilled in user interfaces would see a very different set of job results compared to someone specializing in hardware. Indeed, even people having the same skill sets and current job could have different odds of interacting with the same results.

Results may also be presented without an explicit search performed by a user, specifically in the form of recommendations. Recommender systems are automated computer programs that match items to users in different contexts. In order to achieve accurate recommendations on a large scale, machine learned models are used to estimate user preferences from user feedback data. Such models are constructed using large amounts of high-frequency data obtained from past user interactions with objects or results.

Historically, models to rank job search results in response to a query or perform other recommendations have heavily utilized text and entity-based features extracted from the query and job postings to derive a global ranking or recommendation. An example of such models is a Generalized Linear Model (GLM). A GLM is a generalization of linear regression that allows for response variables that have error distribution models other than a normal distribution. The GLM generalizes linear regression by allowing the linear model to be related to the response variable via a link function and by allowing the magnitude of the variance of each measurement to be a function of its predicted value.

GLMs may utilize the following prediction formula: $g(\mathbb{E}[y_{ij}])=x_{ij}'w$, where this formula predicts the response of user i to item j, and $x_{ij}$ is a feature vector, w is a coefficient vector, $\mathbb{E}[y_{ij}]$ is an expectation of response, and go is a link function.

However, in scenarios where data is abundant, having a more fine-grained model at the user or item level would potentially lead to more accurate prediction, as the user's personal preferences on items and the item's specific attraction for users could be better captured.

An issue that arises, however, in large-scale online systems is that users may be presented with recommendations that the user does not feel are relevant, or alternatively they may be presented with too few (or even no recommendations). This is because most recommender systems use some sort of threshold in determining whether to display a recommendation. In such threshold systems, rather than, for example, displaying the top 10 scoring items according to the recommendation system, regardless of their absolute scores, a threshold is used so that only items with scores above the threshold are displayed. Thus, a user with a large number of high scoring items may be potentially displayed hundreds of recommendations while a user with a low or even zero number of high scoring items will be presented with only a few or even none. While such threshold systems tend to improve upon "top-k" systems in that fewer irrelevant items are displayed to users generally, there still are cases, especially on the outliers, where users may still be presented with irrelevant items or are present with too few or no recommended items.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

One approach for better capturing a user's personal preference for items and an item's specific attraction for users in prediction/recommender systems would be to introduce ID-level regression coefficients in addition to the global regression coefficients in a GLM setting. Such a solution is known as a generalized linear mixed model (GLMix). However, for large data sets with a large number of ID-level coefficients, fitting a GLMix model can be computationally challenging, especially as the solution scales. The scalability bottleneck is overcome by applying parallelized block coordinate descent under a Bulk Synchronous Parallel (BSP) paradigm. This will be described in more detail below.

Additionally, in an example embodiment, predictions/recommendations are made even more accurate by using three models instead of a single GLMix model. Specifically, rather than having a single GLMix model with different coefficients for users and items, three separate models are used and then combined. Each of these models has different granularities and dimensions. A global model may model the similarity between user attributes (e.g., from the member profile or activity history) and item attributes. A per-user model may model user attributes and activity history.

In the context of a job search result ranking or recommendation, this results in the following components:
- a global model that captures the general behavior of how members apply for jobs
- a member-specific model with parameters (to be learned from data) specific to the given member to capture member's personal behavior that deviates from the general behavior, and
- a job-specific model with parameters (to be learned from data) specific to the given job to capture the job's unique behavior that deviates from the general behavior.

The output of the GLMix model is a score. This score is then compared to a threshold, and if the score transgresses the threshold, the corresponding item is available to be recommended to the user via the graphical user interface (whether or not the item is actually recommended to the user may be based on other factors, such as the size of the available display space and the number of items that have higher scores that will also be recommended).

In an example embodiment, rather than a fixed (static) threshold, a dynamic threshold is utilized. This dynamic threshold is based on a harmonic mean of probabilities utilized in the GLMix model. Specifically, the GLMix model may calculate and utilize the probability that a user will engage with a particular item via a graphical user interface, and also a probability that a user will dismiss a particular item via a graphical user interface. Engagement can be defined generally as some sort of positive signal received from the user via the graphical user interface via an item. In the context of job recommendations positive signals may include, for example, applying for a job corresponding to a job posting or saving a job posting. Dismissal can be defined generally as some sort of negative signal received from the user via the graphical user interface via an item, such as explicitly dismissing a job by selecting a "dismiss" or "not for me" or similar button next to the item. In some example embodiments, the negative signal can be inferred, such as by having a positive signal on a first item displayed on a screen and another positive signal on a third item displayed on the screen, where in such cases a negative signal can be inferred on the second item displayed as it is assumed the user saw this second item and deliberately did not engage in an action with a positive signal on it.

In an example embodiment, the harmonic mean (and thus the threshold score) would be calculated as follows:

$$Score = \frac{2 * p_{engage} * (1 - p_{dismiss})}{p_{engage} + (1 - p_{dismiss})}$$

In other words, a first machine learning algorithm may be used to train an engagement model, where the engagement model outputs a prediction of the likelihood that a user will engage with a particular item. A second machine learning algorithm may be used to train a dismiss model, where the dismiss model outputs a prediction of the likelihood that a user will dismiss a particular item. A third machine learning algorithm may be used to train a GLMix model producing an overall score for an item, and this GLMix model may take as input the outputs from the dismiss model and the engagement model. Separately, the outputs from the dismiss model and the engagement model can be used to calculate a harmonic mean, which is set as a threshold, and the score output by the GLMix model for each item is compared with this threshold to determine whether the corresponding item is eligible to be recommended to the user via the graphical user interface. Details of these operations will be described in more detail below.

Figure 1:
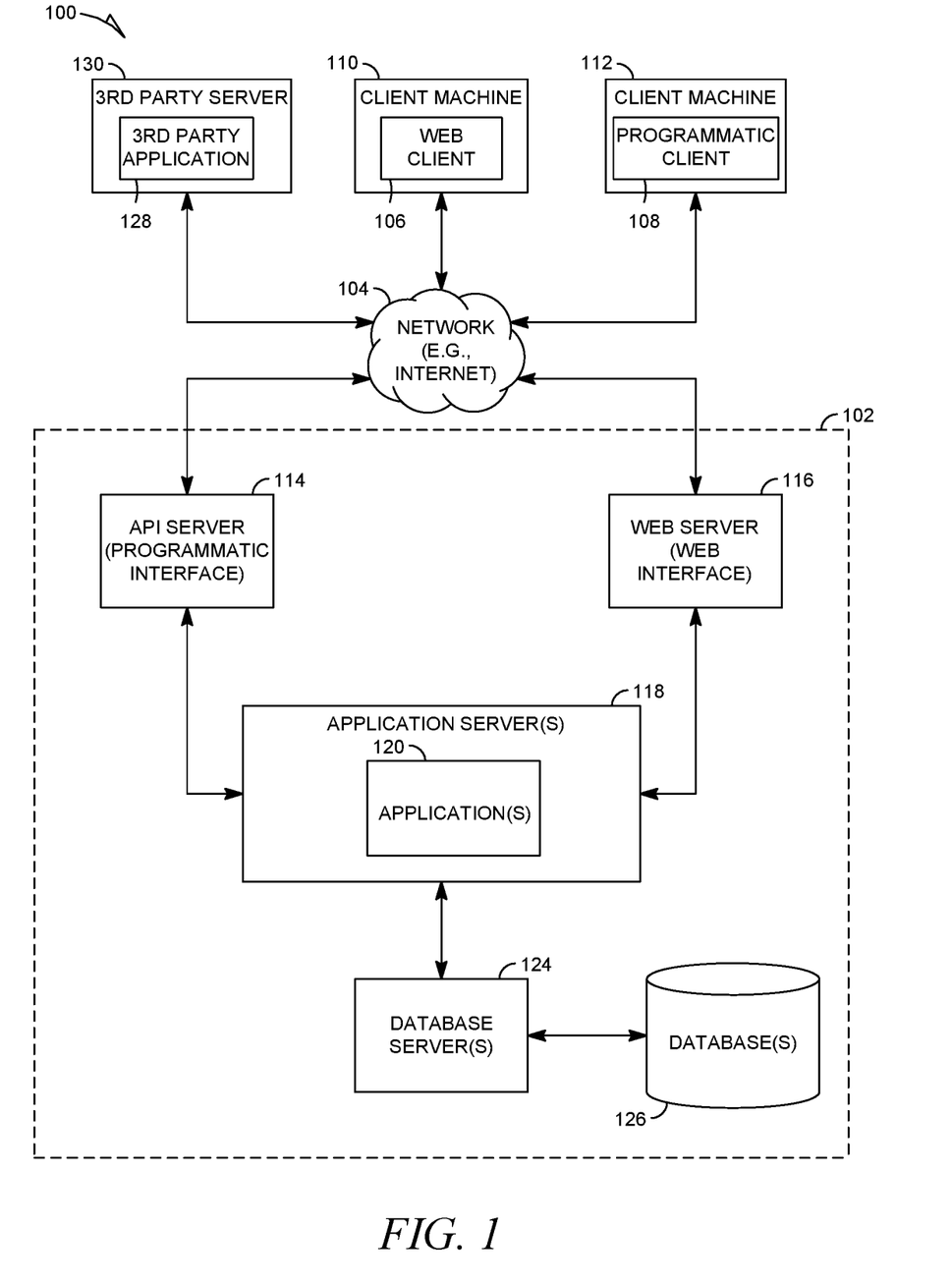
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more functions that are supported by the relevant applications 120 of the networked system 102.

In some embodiments, any web site referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third-party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
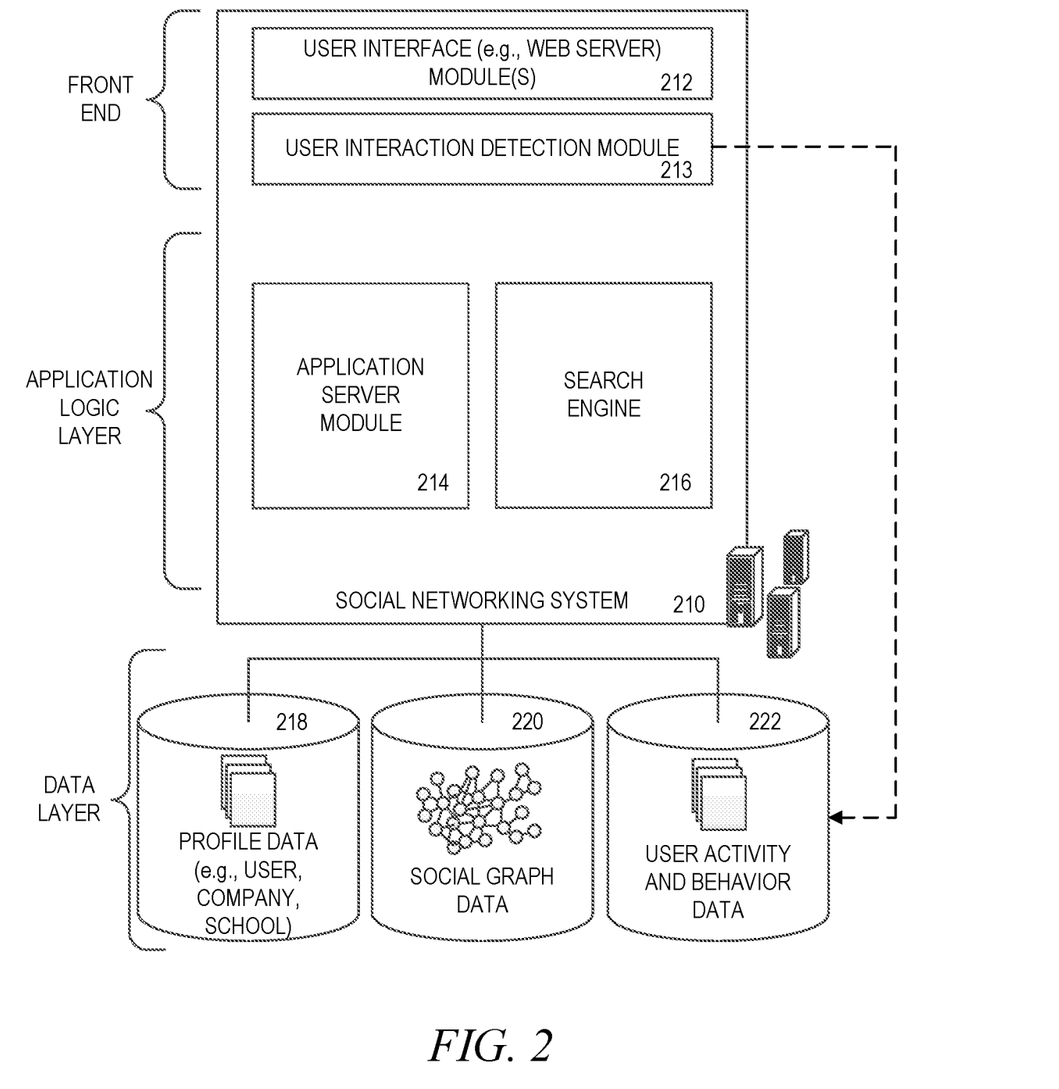
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a user interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases 126, such as a profile database 218 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a user may invite other members, or be invited by other members, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 220.

As users interact with the various applications 120, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 2, by the user activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking system 210 provides an API module via which applications 120 and services can access various data and services provided or maintained by the social networking service. For example, using an API, an application may be able to request and/or receive one or more recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third-party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222), as well as job postings. The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

As described above, embodiments of the present invention may be utilized for item recommendations. These items may take many forms, and indeed any item that is capable of being recommended can constitute an item for purposes of this disclosure and the same techniques can be followed no matter the type of item being considered for recommendation. Nevertheless, a specific embodiment involving job listings being recommended will be discussed. The description of the operations in the context of job listing should not be taken, however, as limiting the scope of the disclosure to just those types of embodiments.

Figure 3:
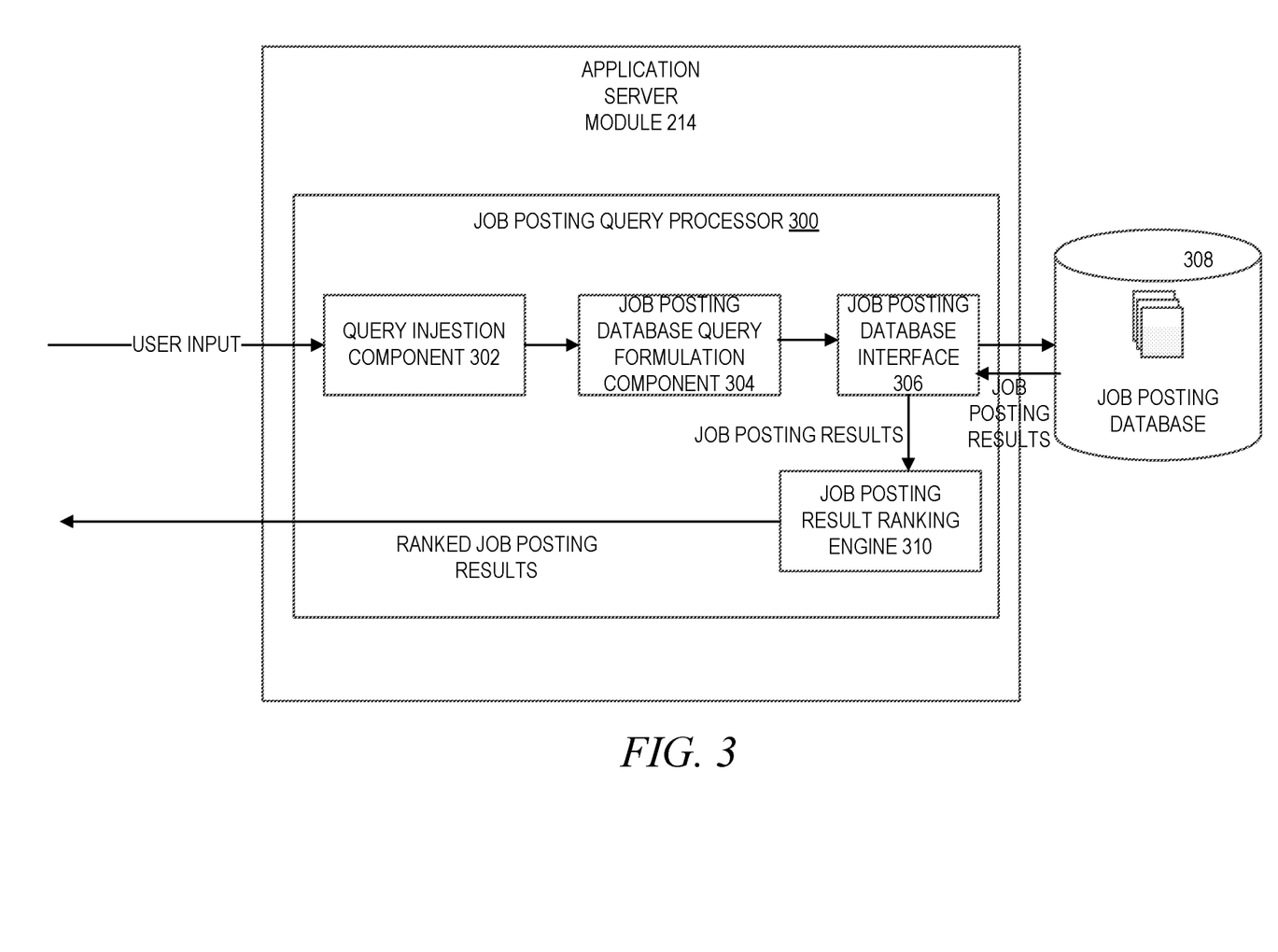
FIG. 3 is a block diagram illustrating an application server module of FIG. 2 in more detail, in accordance with an example embodiment.

FIG. 3 is a block diagram illustrating application server module 214 of FIG. 2 in more detail, in accordance with an example embodiment. While in many embodiments the application server module 214 will contain many subcomponents used to perform various different actions within the social networking system, in FIG. 3 only those components that are relevant to the present disclosure are depicted. A job posting query processor 300 comprises a query ingestion component 302, which receives a user input "query" related to a job posting search via a user interface (not pictured). Notably, this user input may take many forms. In some example embodiments, the user may explicitly describe a job posting search query, such as by entering one or more keywords or terms into one or more fields of a user interface screen. In other example embodiments, the job posting query may be inferred based on one or more user actions, such as selection of one or more filters, other job posting searches by the user, searches for other users or entities, other types of navigation on the social networking graphical user interface, etc.

This "query" may be sent to a job posting database query formulation component 304, which formulates an actual job posting database query, which will be sent via a job posting database interface 306 to job posting database 308. Job posting results responsive to this job posting database query may then be sent to the job posting result ranking engine 310, again via the job posting database interface 306. The job posting result ranking engine 310 then ranks the job posting results and sends the ranked job posting results back to the user interface for display to the user.

Figure 4:
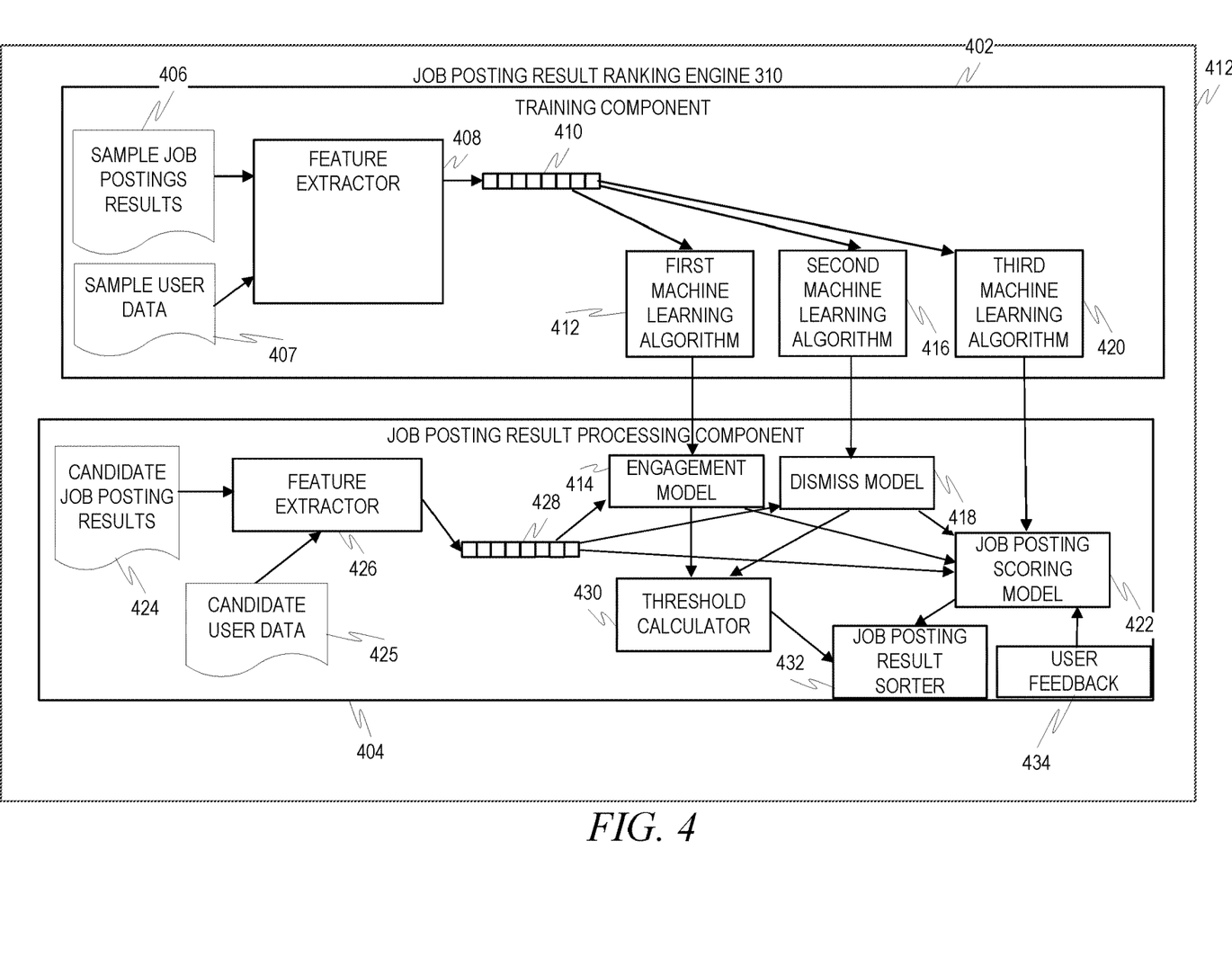
FIG. 4 is a block diagram illustrating job posting result ranking engine 310 of FIG. 3 in more detail, in accordance with an example embodiment.

FIG. 4 is a block diagram illustrating job posting result ranking engine 310 of FIG. 3 in more detail, in accordance with an example embodiment. The job posting result ranking engine 310 may use machine learning techniques to learn a job posting scoring model 422, which can then be used to rank actual job posting results from the job posting database 308.

The job posting result ranking engine 310 may comprise a training component 402 and a job posting result processing component 404. The training component 402 feeds sample job postings results 406 and sample member data 407 into a feature extractor 408 that extracts one or more features 410 for the sample job postings results 406 and sample member data 407. The sample job postings results 406 may each include job postings results produced in response to a particular query as well as one or more labels, such as a job posting application likelihood score, which is a score indicating a probability that a user with a corresponding sample user data 407 will apply for the job associated with the corresponding sample job postings result 406.

Sample user data 407 may include, for example, a history of job searches and resulting expressions of interest (such as clicking on job posting results or applications to corresponding jobs) or dismissals in particular job posting results for particular users. In some example embodiments, sample user data 407 can also include other data relevant for personalization of the query results to the particular user, such as a user profile for the member or a history of other user activity.

A first machine learning algorithm 412 trains an engagement model 414 using the extracted features 410. This training involves learning constants (called weights) to be applied to the features in a formula within the model. Evaluation of the formula at runtime will produce a score by plugging in features and multiplying each of those features by the learned weights. The weights may be retrained using new sample data or user feedback, creating a potentially constantly evolving engagement model 414. As will be discussed below, any of a number of different machine learning algorithms may be used for this training. Many or most of these machine learning algorithms apply some sort of optimization test at the end of each iteration of an iterative training processes so that the training ends when the optimization test has been passed.

A second machine learning algorithm 416 trains a dismiss model 418 using the extracted features 410. This training involves learning constants (called weights) to be applied to the features in a formula within the model. Evaluation of the formula at runtime will produce a score by plugging in features and multiplying each of those features by the learned weights. The weights may be retrained using new sample data or user feedback, creating a potentially constantly evolving dismiss model 418. As will be discussed below, any of a number of different machine learning algorithms may be used for this training. Many or most of these machine learning algorithms apply some sort of optimization test at the end of each iteration of an iterative training processes so that the training ends when the optimization test has been passed.

A third machine learning algorithm 420 trains a job posting scoring model 422 using the extracted features 410. This training involves learning constants (called weights) to be applied to the features in a formula within the model. Evaluation of the formula at runtime will produce a score by plugging in features and multiplying each of those features by the learned weights. The weights may be retrained using new sample data or user feedback, creating a potentially constantly evolving job posting scoring model 422. As will be discussed below, any of a number of different machine learning algorithms may be used for this training. Many or most of these machine learning algorithms apply some sort of optimization test at the end of each iteration of an iterative training processes so that the training ends when the optimization test has been passed.

As described briefly earlier, the job posting scoring model 422 may take as input the outputs of the engagement model 414 and dismiss model 418. While this process will be described in more detail below, it should be noted that in some example embodiments the engagement model 414 and dismiss model 418 may be actually trained as part of the job posting scoring model 422 as opposed to separate models.

It should also be noted that while FIG. 4 depicts the first machine learning algorithm 412, second machine learning algorithm 416, and third machine learning algorithm 420 as all taking the same features 410 as input, in some example embodiments each of the first machine learning algorithm 412, second machine learning algorithm 416, and third machine learning algorithm 420 may actually take different features as input, possibly even derived from different sample job postings results 416 and different sample user data 407.

In the job posting result processing component 404, candidate job postings results 424 resulting from a particular query are fed to a feature extractor 426 along with a candidate user data 425. The feature extractor 426 extracts one or more features 428 from the candidate job postings results 424 and candidate user data 425. These features 428 are then fed to the engagement model 414, dismiss model 418, and job posting scoring model 422, although as in the training in some embodiments the features may be different for the different models. The job posting scoring model 422 outputs a job posting application likelihood score for each candidate job postings result for the particular query.

The outputs from the engagement model 414 and dismiss model 418 may then be fed to a threshold calculator 430. The threshold calculator calculates a user-specific threshold based on harmonic mean, as described above. This threshold is then passed to a job posting result sorter 432, which also takes the output of the job posting scoring model 422 and compares the scores to the threshold, sorting the qualifying job postings that have scores that transgress the threshold for possible display to the user.

It should be noted that the job posting result ranking model 422 may be periodically updated via additional training and/or user feedback 434. The user feedback may be either feedback from members performing searches, or from companies corresponding to the job postings. The feedback 434 may include an indication about how successful the job posting result ranking model 422 is in predicting member interest in the job posting results presented.

The machine learning algorithms 412, 416, and 420 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, a multi-class logistical regression model is used.

Figure 5:
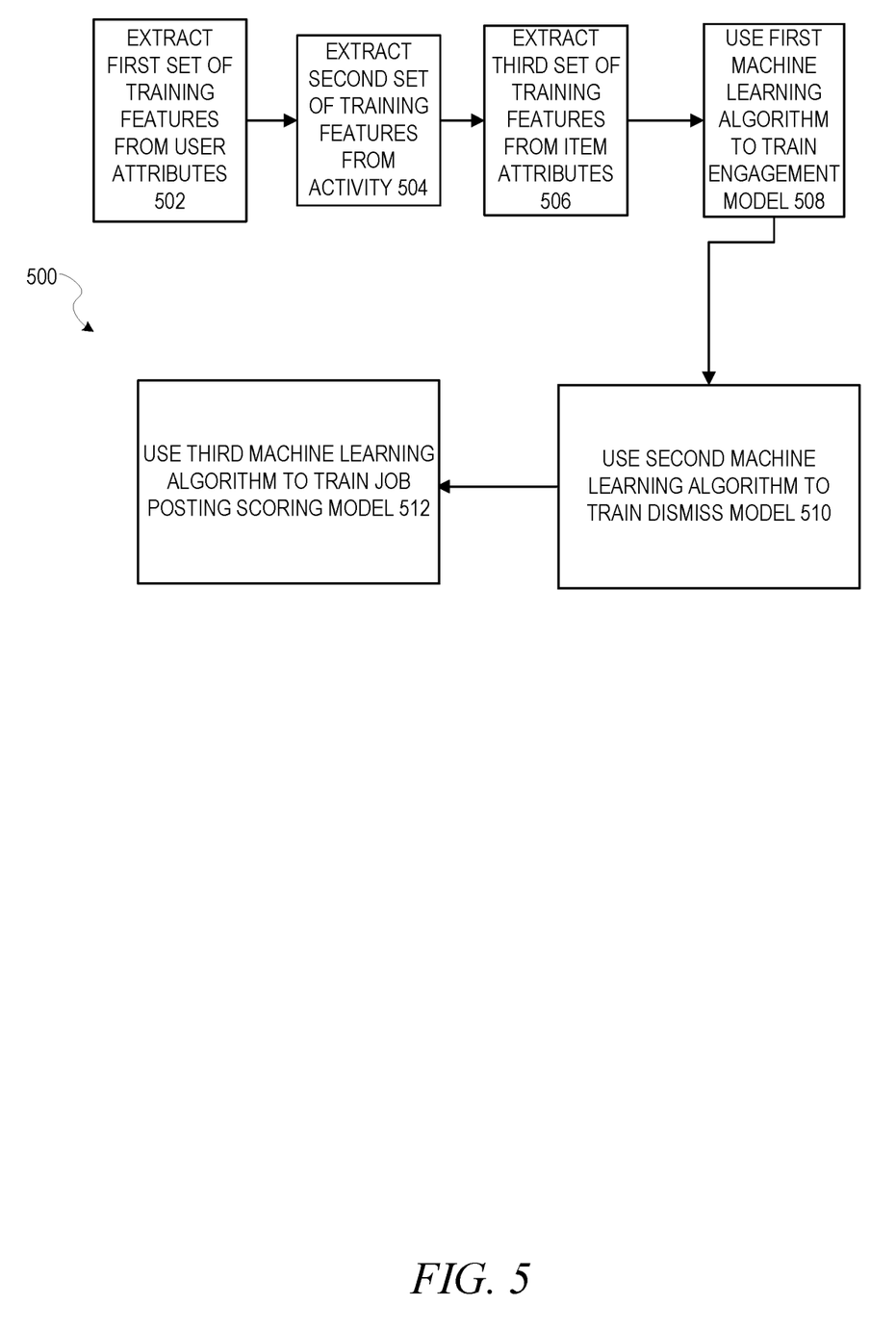
FIG. 5 is a flow diagram illustrating a method for training a job posting scoring model in accordance with an example embodiment.

FIG. 5 is a flow diagram illustrating a method 500 for training a job posting scoring model in accordance with an example embodiment. At operation 502, a first set of training features is extracted from attributes of sample users in a social networking service. In some example embodiments, these training features may be extracted by retrieving relevant information from fields of user profiles or other user-specific information maintained by the social networking service. At operation 504, a second set of training features is extracted from activity of the users, with respect to items, in the social networking service. These training features may be extracted from information about which items the users interacted with, and/or how frequently they interact with them.

At operation 506, a third set of training features is extracted from attributes of items in the social networking service. Items may include, for example, job postings, articles, videos, announcements, or any other object in the social networking service that can be interacted with (e.g., applied for, shared, linked, commented on) by a user. In some example embodiments, these training features may be obtained by parsing the item itself and/or metadata about the item. For example, a job posting may include text portions from which various training features, such as term frequency-inverse document frequency, can be obtained, as well as metadata such as category and geographic region, from which various training features may be extracted.

At operation 508, a first machine learning algorithm is used to train an engagement model to produce a score indicating a likelihood that a user will engage with an item in the social networking service, based on the first, second, and third set of training features.

At operation 510, a second machine learning algorithm is used to train a dismiss model to produce a score indicating a likelihood that a user will dismiss an item in the social networking service, based on the first, second, and third set of training features.

At operation 512, a third machine learning algorithm is used to train a job posting scoring model to produce a score for an item, based on the output of the engagement model and the dismiss model, and based on the first, second, and third set of training features. In an example embodiment, the job posting scoring model is a GLMix model.

Figure 6:
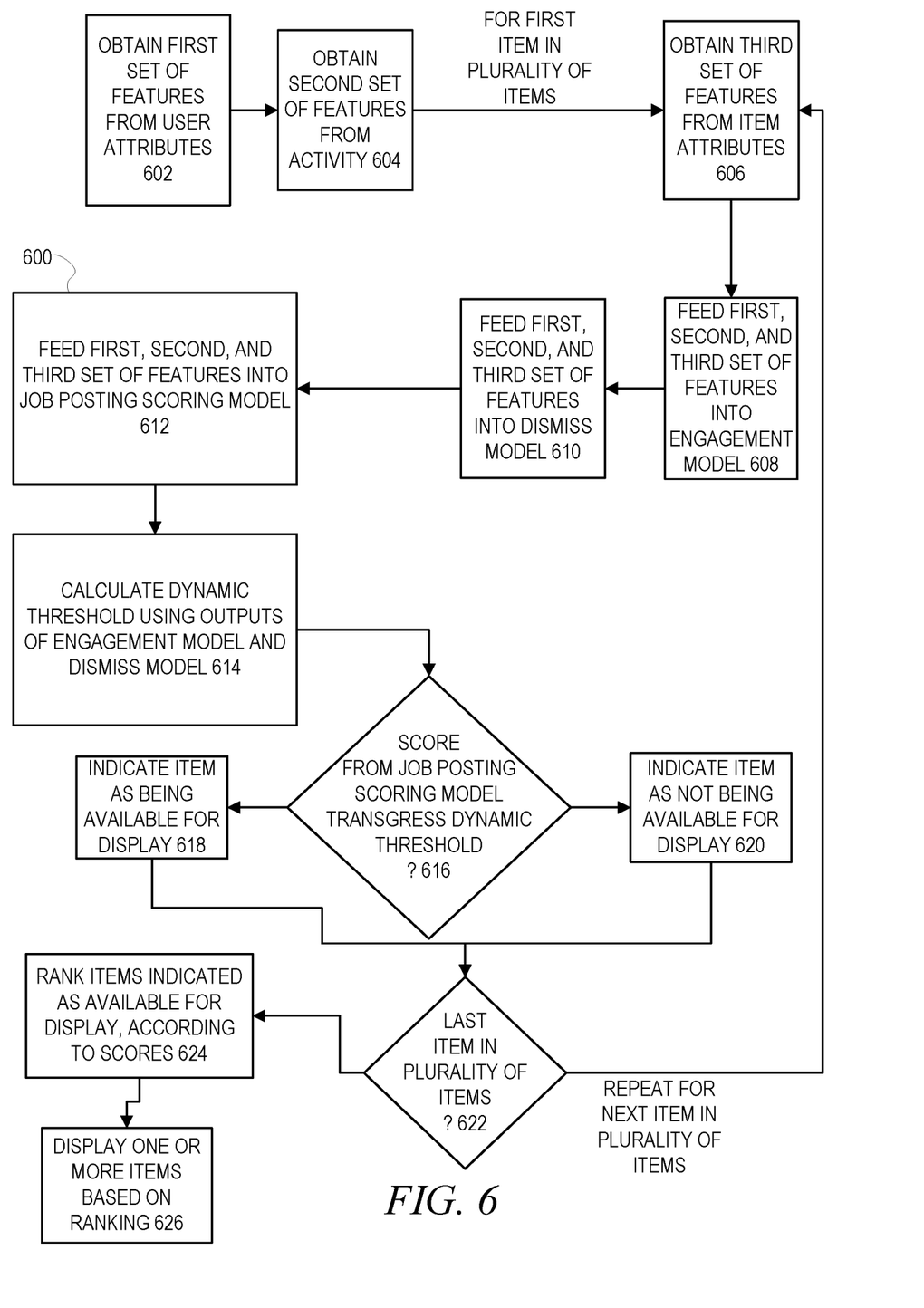
FIG. 6 is a flow diagram illustrating a method for using a job posting scoring model in accordance with an example embodiment.

FIG. 6 is a flow diagram illustrating a method 600 for using a job posting scoring model in accordance with an example embodiment.

At operation 602, a first set of features derived from attributes of a first user in a social networking service is obtained. At operation 604, a second set of features derived from activity of the first user, with respect to a plurality of items in the social networking service is obtained. A loop is then begun for each of a plurality of items being evaluated for display to the first user. At operation 606, a third set of features derived from attributes of the item in the social networking service is obtained.

At operation 608, the first, second, and third set of features are fed into the engagement model. At operation 610, the first, second, and third set of features are fed into a dismiss model. At operation 612, the first, second, and third set of features and the outputs of the engagement model from operation 608 and the dismiss model from operation 610 are fed into the job posting scoring model, producing a score for the item. At operation 614, the outputs of the engagement model and the dismiss model are used to calculate a dynamic threshold. This dynamic threshold, as explained earlier, is calculated using a harmonic mean of the outputs. At operation 616, the score from operation 612 is compared to the threshold. If it transgresses the threshold, then at operation 618 the item is indicated as being available for display to the user. If not, then at operation 620, the item is indicated as not being available for display to the user.

At operation 622, it is determined if this is the last item in the plurality of items. If not, then the method 600 loops back to operation 606 for the next item in the plurality of items. If so, then at operation 624, the items that have been indicated as being available for display to the user are ranked according to the scores assigned to each in operation 612. At operation 626, one or more items are displayed to the first user in a graphical user interface, based on the ranking.

Figure 7:
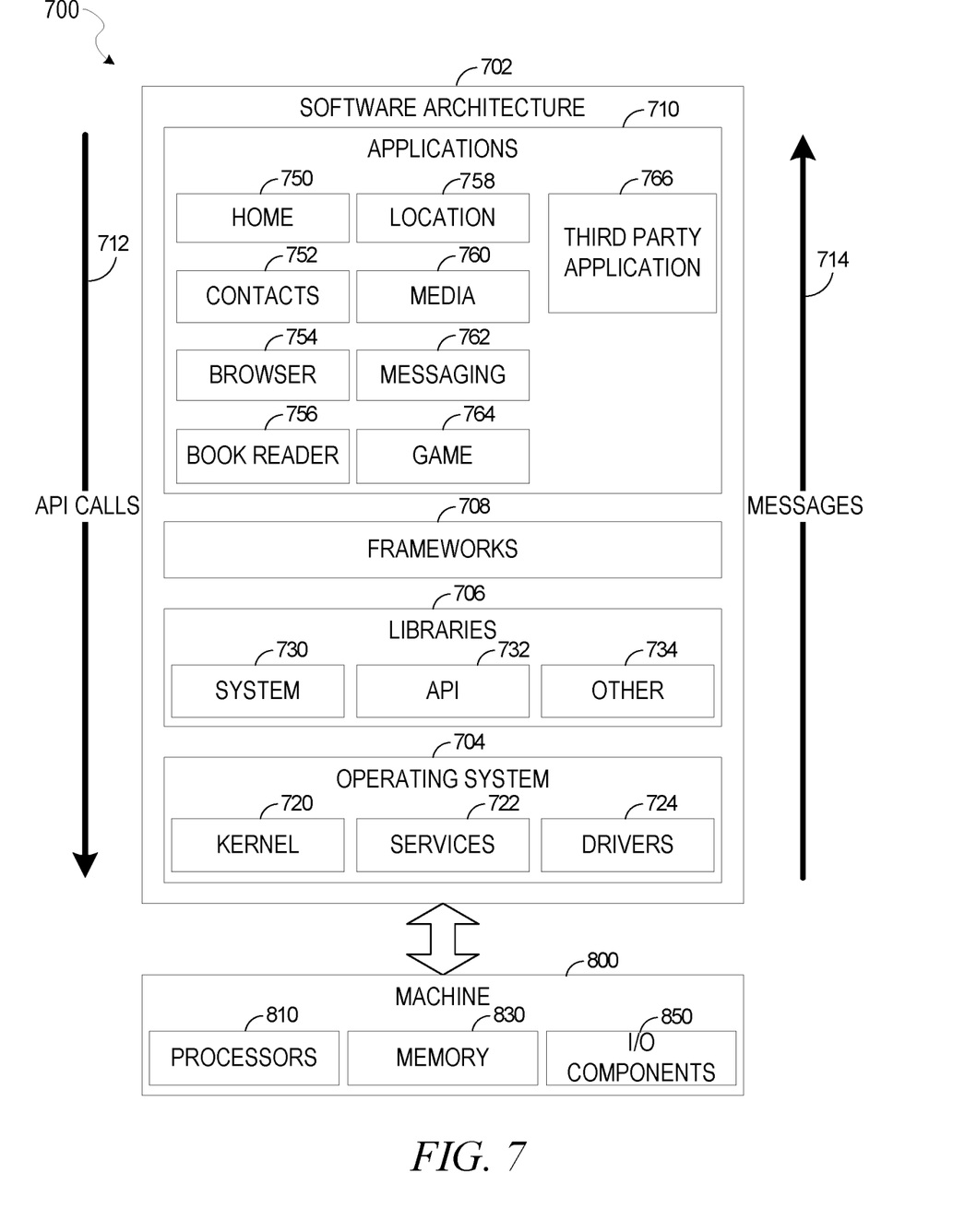
FIG. 7 is a block diagram illustrating a software architecture, in accordance with an example embodiment.

FIG. 7 is a block diagram 700 illustrating a software architecture 702, which can be installed on any one or more of the devices described above. FIG. 7 is merely a non-limiting example of a software architecture, and it will be appreciated that many other architectures can be implemented to facilitate the functionality described herein. In various embodiments, the software architecture 702 is implemented by hardware such as a machine 800 of FIG. 8 that includes processors 810, memory 830, and input/output (I/O) components 850. In this example architecture, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke API calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications, such as a third-party application 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third-party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 766 can invoke the API calls 712 provided by the operating system 704 to facilitate functionality described herein.

Figure 8:
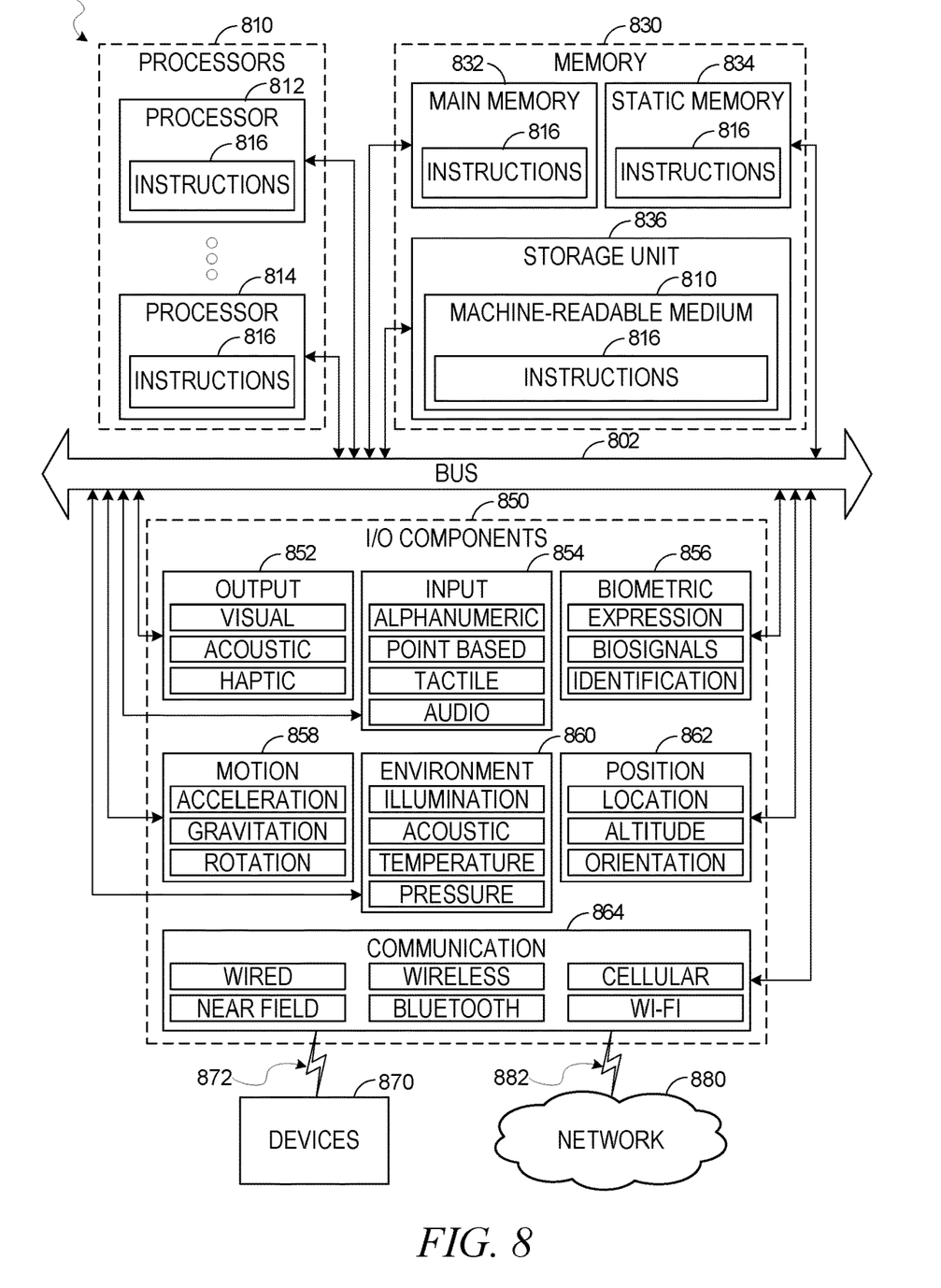
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine to perform any one or more of the methodologies discussed herein, according to an example embodiment. Specifically, FIG. 8 shows a diagrammatic representation of the machine 800 in the example form of a computer system, within which instructions 816 (e.g., software, a program, an application 710, an applet, an app, or other executable code) for causing the machine 800 to perform any one or more of the methodologies discussed herein may be executed. For example, the instructions 816 may cause the machine 800 to execute the method 500 of FIG. 5 and method 600 of FIG. 6. Additionally, or alternatively, the instructions 816 may implement FIGS. 1-6, and so forth. The instructions 816 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 830, 832, 834, and/or memory of the processor(s) 810) and/or the storage unit 836 may store one or more sets of instructions 816 and data structures (e.g., software) embodying or utilized by any one or more of the methodologies or functions described herein. These instructions (e.g., the instructions 816), when executed by the processor(s) 810, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 816 and/or data. The terms shall accordingly be taken to include, but not be limited to, solid-state memories, and optical and magnetic media, including memory internal or external to the processors 810. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 816 may be transmitted or received over the network 880 using a transmission medium via a network interface device (e.g., a network interface component included in the communication components 864) and utilizing any one of a number of well-known transfer protocols (e.g., HTTP). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
 a computer-readable medium having instructions stored thereon, which, when executed by a processor, cause the system to perform operations comprising:
 obtaining a first set of features derived from attributes of a first user in a social networking service;
 obtaining a second set of features derived from activity of the first user, with respect to a plurality of items in the social networking service;
 for each of a plurality of items considered for display in a graphical user interface of the social networking service:
 obtaining a third set of features derived from attributes of the item;
 feeding the first, second, and third set of features into an engagement model trained to output an engagement score indicating a likelihood that the first user will positively engage with the item;
 feeding the first, second, and third set of features into a dismiss model trained to output a dismiss score indicating a likelihood that the first user will negatively engage with the item;
 feeding the engagement score and dismiss score into an item scoring model trained to output an item score;
 using the engagement score and dismiss score to calculate a dynamic threshold;
 comparing the item score to the dynamic threshold;

in response to a determination that the item score does not transgress the dynamic threshold, eliminating the item from consideration for display in the graphical user interface of the social networking service;
ranking the items considered for display in the graphical user interface based on their respective item scores; and
displaying one or more of the items considered for display in the graphical user interface based on the ranking.

2. The system of claim 1, wherein the item scoring model is a Generalized Linear Mixed Effect (GLMix) mode.

3. The system of claim 1, wherein the operations further comprise:
training the engagement model by feeding training data into a first machine learning algorithm, the training data having information about which items a plurality of users have positively engaged with; and
training the dismiss model by feeding training data into a second machine learning algorithm, the training data having information about which items a plurality of users have negatively engaged with.

4. The system of claim 3, herein the first and second machine learning algorithms are identical.

5. The system of claim 4, herein the first and second machine learning algorithms are generalized linear mixed effect (GLMix) machine learning algorithms.

6. The system of claim 1, wherein the harmonic mean is equal to $$\frac{2 * p_{engage} * (1 - p_{dismiss})}{p_{engage} + (1 - p_{dismiss})},$$

wherein $p_{engage}$ is the engagement score and $p_{dismiss}$ is the dismiss score.

7. The system of claim 1, wherein the items are job postings listed in the social networking service.

8. A computerized method comprising:
obtaining a first set of features derived from attributes of a first user in a social networking service;
obtaining a second set of features derived from activity of the first user, with respect to a plurality of items in the social networking service;
for each of a plurality of items considered for display in a graphical user interface of the social networking service:
  obtaining a third set of features derived from attributes of the item;
  feeding the first, second, and third set of features into an engagement model trained to output an engagement score indicating a likelihood that the first user will positively engage with the item;
  feeding the first, second, and third set of features into a dismiss model trained to output a dismiss score indicating a likelihood that the first user will negatively engage with the item;
  feeding the engagement score and dismiss score into an item scoring model trained to output an item score;
  using the engagement score and dismiss score to calculate a dynamic threshold;
  comparing the item score to the dynamic threshold;
  in response to a determination that the item score does not transgress the dynamic threshold, eliminating the item from consideration for display in the graphical user interface of the social networking service;
ranking the items considered for display in the graphical user interface based on their respective item scores; and
displaying one or more of the items considered for display in the graphical user interface based on the ranking.

9. The method of claim 8, wherein the item scoring model is a Generalized Linear Mixed Effect (GLMix) mode.

10. The method of claim 8, further comprising:
training the engagement model by feeding training data into a first machine learning algorithm, the training data having information about which items a plurality of users have positively engaged with; and
training the dismiss model by feeding training data into a second machine learning algorithm, the training data having information about which items a plurality of users have negatively engaged with.

11. The method of claim 10, herein the first and second machine learning algorithms are identical.

12. The method of claim 11, herein the first and second machine learning algorithms are generalized linear mixed effect (GLMix) machine learning algorithms.

13. The method of claim 8, wherein the harmonic mean is equal to $$\frac{2 * p_{engage} * (1 - p_{dismiss})}{p_{engage} + (1 - p_{dismiss})},$$

wherein $p_{engage}$ is the engagement score and $p_{dismiss}$ is the dismiss score.

14. The method of claim 8, wherein the items are job postings listed in the social networking service.

15. A non-transitory machine-readable storage medium comprising instructions which, when implemented by one or more machines, cause the one or more machines to perform operations comprising:
obtaining a first set of features derived from attributes of a first user in a social networking service;
obtaining a second set of features derived from activity of the first user, with respect to a plurality of items in the social networking service;
for each of a plurality of items considered for display in a graphical user interface of the social networking service:
  obtaining a third set of features derived from attributes of the item;
  feeding the first, second, and third set of features into an engagement model trained to output an engagement score indicating a likelihood that the first user will positively engage with the item;
  feeding the first, second, and third set of features into a dismiss model trained to output a dismiss score indicating a likelihood that the first user will negatively engage with the item;
  feeding the engagement score and dismiss score into an item scoring model trained to output an item score;
  using the engagement score and dismiss score to calculate a dynamic threshold;
  comparing the item score to the dynamic threshold;
  in response to a determination that the item score does not transgress the dynamic threshold, eliminating the item from consideration for display in the graphical user interface of the social networking service;
ranking the items considered for display in the graphical user interface based on their respective item scores; and
displaying one or more of the items considered for display in the graphical user interface based on the ranking.

16. The non-transitory machine-readable storage medium of claim 15, wherein the item scoring model is a Generalized Linear Mixed Effect (GLMix) mode.

17. The non-transitory machine-readable storage medium of claim 15, wherein the operations further comprise:
- training the engagement model by feeding training data into a first machine learning algorithm, the training data having information about which items a plurality of users have positively engaged with; and
- training the dismiss model by feeding training data into a second machine learning algorithm, the training data having information about which items a plurality of users have negatively engaged with.

18. The non-transitory machine-readable storage medium of claim 17, wherein the first and second machine learning algorithms are identical.

19. The non-transitory machine-readable storage medium of claim 18, wherein the first and second machine learning algorithms are generalized linear mixed effect (GLMix) machine learning algorithms.

20. The non-transitory machine-readable storage medium of claim 15, wherein the harmonic mean is equal to $$\frac{2 * p_{engage} * (1 - p_{dismiss})}{p_{engage} + (1 - p_{dismiss})},$$

wherein $p_{engage}$ is the engagement score and $p_{dismiss}$ is the dismiss score.

\* \* \* \* \*

UNITED STATES PATENT AND TRADEMARK OFFICE
CERTIFICATE OF CORRECTION

PATENT NO. : 11,194,877 B2  
APPLICATION NO. : 16/669198  
DATED : December 7, 2021  
INVENTOR(S) : Zhang et al.

Page 1 of 1

It is certified that error appears in the above-identified patent and that said Letters Patent is hereby corrected as shown below:

In the Claims

In Column 17, Line 21, in Claim 4, delete "herein" and insert --wherein-- therefor In Column 17, Line 23, in Claim 5, delete "herein" and insert --wherein-- therefor In Column 17, Line 26, in Claim 6, delete "the" and insert --a-- therefor In Column 18, Line 15, in Claim 11, delete "herein" and insert --wherein-- therefor In Column 18, Line 17, in Claim 12, delete "herein" and insert --wherein-- therefor In Column 18, Line 20, in Claim 13, delete "the" and insert --a-- therefor In Column 19, Line 22, in Claim 20, delete "the" and insert --a-- therefor Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*